United States Patent
Loebach

(10) Patent No.: US 8,046,543 B2
(45) Date of Patent: Oct. 25, 2011

(54) SELECTIVELY RETAINING A TOPMOST SUBPOOL EXPANSION TO PREVENT THRASHING

(75) Inventor: Gary P. Loebach, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 798 days.

(21) Appl. No.: 12/141,788

(22) Filed: Jun. 18, 2008

(65) Prior Publication Data

US 2009/0319746 A1    Dec. 24, 2009

(51) Int. Cl.
*G06F 12/02* (2006.01)

(52) U.S. Cl. .......................................... 711/159; 711/170
(58) Field of Classification Search ........................ None
See application file for complete search history.

(56) References Cited

U.S. PATENT DOCUMENTS

| | | | | |
|---|---|---|---|---|
| 4,422,145 A * | 12/1983 | Sacco et al. | .................. | 711/160 |
| 5,093,912 A * | 3/1992 | Dong et al. | .................. | 718/104 |
| 5,440,692 A * | 8/1995 | Janicek | ........................ | 711/100 |
| 5,675,797 A * | 10/1997 | Chung et al. | .................. | 718/104 |
| 5,978,893 A * | 11/1999 | Bakshi et al. | .................. | 711/171 |
| 6,070,202 A * | 5/2000 | Minkoff et al. | ................. | 710/56 |
| 6,718,445 B1 * | 4/2004 | Lewis et al. | .................... | 711/159 |
| 2002/0046204 A1 * | 4/2002 | Hayes | ............................... | 707/1 |
| 2006/0074872 A1 * | 4/2006 | Gordon | ............................ | 707/3 |
| 2008/0065644 A1 * | 3/2008 | Pasupuleti et al. | ............. | 707/10 |

* cited by examiner

*Primary Examiner* — Kaushikkumar Patel
(74) *Attorney, Agent, or Firm* — Patents on Demand, P.A.; Brian K. Buchheit; Scott M. Garrett

(57) ABSTRACT

A method and program product to selectively retain or discard subpool expansions. When a subpool has been tuned to its limit (a maximum extension size is established), then a subsequent expansion allocation of this tuned expansion is queued on top of a memory subpool. Otherwise, expansions are queued on the bottom of the subpool. All expansions other than the topmost one, which is retained by the system, are rapidly returned to the system when their storage is no longer needed by the various processes that have finished. The topmost expansion is retained as long as the subpool remains tuned to the maximum extension size. By permitting the topmost expansion to remain available to the subpool for storage allocation, the topmost expansion is retained beyond a short term period typical of expansions, which allows the topmost expansion to stay around for a sufficient time to prevent subpool thrashing.

15 Claims, 1 Drawing Sheet

SELECTIVELY RETAINING A TOPMOST SUBPOOL EXPANSION TO PREVENT THRASHING

BACKGROUND OF THE INVENTION

The present invention relates to the field of memory management and, more particularly, to selectively retaining a topmost subpool expansion to prevent thrashing.

Performance of computing systems that perform dynamic memory allocation can be poor due to a need to continuously allocate and deallocate memory blocks. One way to increase performance is to utilize a subpool of allocated memory. A subpool is a memory region that includes a set of buffers, within which data can be placed. Multiple different subpools can be utilized in a computing system, where each is dedicated to an associated application, thread, or task.

Within each subpool, a buffer replacement scheme (e.g., First-In-First-Out (FIFO), Least Recently Used (LRU), etc) can be established for determining which of the included buffers is to be used to store a new data element. A data element placed in a subpool buffer can be accessed until it expires, which is when it is overwritten by a different data element. When a time a data element is held in a queue is less than a desired time, excessive data swaps in and out of the subpool occur. These data swaps diminish performance and consume system resources.

To improve performance, subpools can be tuned or optimized so that their size and configuration is well suited for the memory needs that are being supported. Tuning a subpool can involve calculating a duration that data elements are retained within the subpool and making adjustments to ensure that a desired retention exists. One way of tuning a subpool is to change a buffer size, which changes a number of data "slots" available in the subpool. Making a buffer size too small can require a data element be placed in multiple buffers, however, since each buffer must be of sufficient size to store a desired data element. When a buffer size is fully tuned or optimized for a situation, but when a time in queue for data elements is still too low, a subpool expansion can be allocated.

Subpool memory systems that enable extents often limit a maximum number of expansions for a subpool to a small number, where these expansions are rapidly released back to available unallocated memory. Releasing a subpool expansion results in all data included in the expansion being removed. When the deallocation occurs before a data handling surge that caused the subpool expansion to be created is handled, the system will be in a state equivalent to that that triggered the subpool expansion to be created. Thus, a new subpool expansion is triggered, which will again be relatively rapidly released. A "thrashing" situation can result, where one or more subpool expansions are continuously allocated and deallocated. Both adding and returning expansions involves a call to system level services, which are costly in terms of CPU cycles.

DETAILED DESCRIPTION OF THE INVENTION

Figure 1:
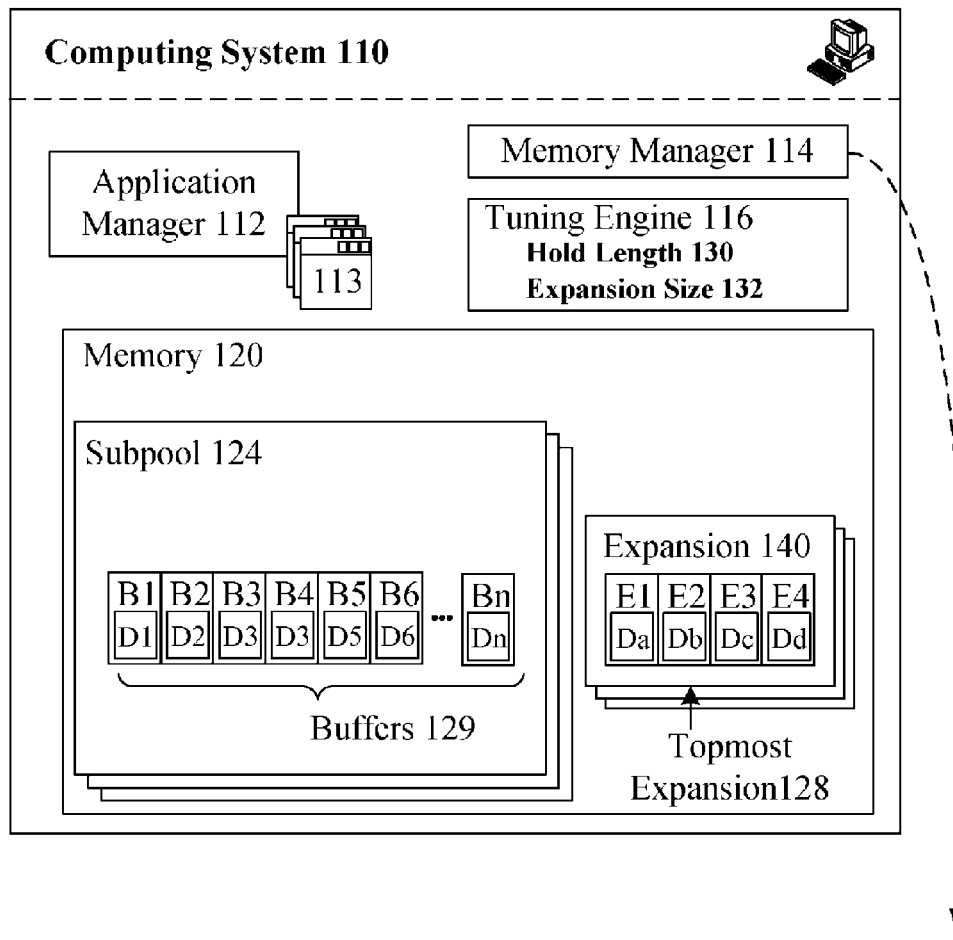
FIG. 1 is a schematic diagram in which a computer system utilizes a subpool of memory to stored application data in accordance with an embodiment of the inventive arrangements disclosed herein.

The present invention discloses a solution to selectively retain or release subpool expansions. In the solution, when a subpool has been tuned to its limit (a maximum extension size is established), then a subsequent expansion allocation of this tuned limited is queued on top of a memory subpool. Otherwise, expansions are queued on bottom of the subpool. All expansions other than the topmost one, which is retained by the system, are rapidly returned to the system when their storage is no longer needed by the various processes that have finished. The topmost expansion is retained as long as the subpool remains tuned to the maximum extension size. By permitting the topmost expansion to remain available to the subpool for storage allocation, the topmost expansion is retained beyond a short term period typical of expansions, which allows the topmost expansion to stay around for a sufficient time to prevent subpool thrashing.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram in which a computer system 110 utilizes a subpool 124 of memory 120 to stored application 113 data in accordance with an embodiment of the inventive arrangements disclosed herein. The computing system 110 can include an application manager 112, a memory manager 114, and a tuning engine 116, each of which can be implemented in computer usable program code. An application manager 112 can manage the applications 113. A memory manager 114 can manage the memory 120. The tuning engine 116 can tune/optimize the memory 120 structures to increase overall performance.

One or more subpools 124 can be included in memory, each dedicated to a specific applications 113, thread, or process. Each subpool 124 can include a set of buffers 129. Each of these buffers 129 (B1, B2, B3, B4, B5, B6 . . . Bn) can store a data element (D1, D2, D3, D4, D5, D6 . . . Dn). Each of the buffers 129 represent a particular size of allocated storage space, which will often (but need not) be the same across the set of buffers 129 associated with a specific subpool 124. Using buffers 129 of equivalent size permits the memory manager 114 to operate more efficiently, consuming fewer CPU cycles. The subpool 124 can utilize a buffer retention scheme to determine which buffer new data is placed within. For example, the subpool 124 can use a FIFO scheme, in which a buffer containing data that has been included in the subpool 124 the longest is replaced with a new data element. Tuning engine 116 can adjust a number and a size of buffers 129 to optimize performance.

When memory in the subpool 124 has already been optimized, and when an increase in data storage is needed, one or more expansion 140 can be established. Each subpool expansion 140 can include a set of buffers (E1, E2, E3, E4, etc.), each capable of storing a data element (Da, Db, Dc, Dd, etc.). Computing system 110 can retain a topmost 128 expansion 140 to prevent occurrences of thrashing. That is, the topmost expansion 128 is automatically retained for a sufficient time to prevent thrashing. All other expansions 140 are rapidly returned to the system 110 when their storage is no longer immediately needed.

Code 150 represents code of the memory manager 114 that is executed to determine whether an expansion 140 is to be returned to available memory or retained. It should be appreciated that the code 150 is presented to illustrate a simple technique for preventing subpool extent thrashing and that derivatives and alterations to the code 150 are expected and are to be considered within the scope of the present invention.

Code 150 can begin in a context where an appropriate subpool expansion size has already been determined. That is, the tuning engine 116 can dynamically adjust parameters of the memory 120. These parameters include a hold length 130 and an extension size 132. The hold length 130 represents a subpool expansion size that is sufficient to handle all storage requests. This max expansion has a limit, which can be based upon memory 120 constraints, which is represented by extension size 132. Programmatic code prior to code 150 can have determined an appropriate subpool expansion size 132. Further, the hold length 130 value can be adjusted appropriately if tuning engine 116 is still adjusting the subpool 124.

Section 152 of code 150 decides how expansion information is queued. In section 152, if an expansion size (parameter 132) is equal to hold length (parameter 130), then expansion information is queued on top (topmost expansion 128). Otherwise, it is queued to the end.

Section 154 evaluates if contraction of an expansion 140 is to occur. In section 154, if freeing expansion is the first element of the queue and is equal to hold length (parameter 130) then the expansion is retained (i.e., the expansion is the topmost expansion 128). Otherwise, the expansion is released.

FIG. 1 illustrates the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for preventing subpool thrashing comprising:
determining an appropriate subpool expansion size needed to satisfy storage requests by processes able to utilize a subpool of memory;
dynamically repeating the determining of the appropriate subpool expansion size as storage requirements change;
selectively adding an expansion to the subpool to satisfy storage requests when additional storage is needed;
queuing the added expansion on top of the subpool when a value of the subpool expansion size is a maximum size at a time that the added expansion is to be queued;
queuing the added expansion on bottom of the subpool when the value of the subpool expansion size less than the maximum size at a time that the added expansion is to be queued;
determining that processes utilizing the queued expansion of the subpool have completed processing so that the queued expansion is no longer immediately necessary for storage of values relating to currently executing processes;
retaining only one expansion queued on top of the subpool and when the value of the subpool expansion size is the maximum size at a time the currently executing processes utilizing the queued expansion have completed processing; and
releasing the queued expansion when the queued expansion is not on top of the subpool and when the queued expansion is on top of the subpool and when the value of the subpool expansion size is less than the maximum size at the time the currently executing processes utilizing the queued expansion have completed processing.

2. The method of claim 1, further comprising:
tuning the subpool to adjust the subpool expansion size when additional storage is needed and when the subpool expansion size is not at the maximum size.

3. The method of claim 1, wherein selectively retaining expansions added on top of the subpool minimizes a frequency for which short term storage is allocated and released to prevent subpool thrashing.

4. The method of claim 3, wherein the selective retention of expansions added on top of the subpool occurs based upon memory management code, whereby the selective retention of expansions on top of the subpool is able to satisfy short term storage requests while avoiding executions of costly system code.

5. The method of claim 4, wherein the subpool is one of a plurality of subpools handled by the memory management code, wherein each of said plurality of subpools corresponds to at least one of an application, thread, and task, and wherein said subpool and said expansion each comprise a plurality of buffers, wherein each of the plurality of buffers is of an equivalent size to the other ones of the plurality of buffers.

6. A method for improving subpool performance comprising:
queuing an expansion to a memory subpool on top of the subpool when a subpool expansion size is tuned to a maximum size;
retaining the expansion queued on top of the subpool while the subpool expansion size is tuned to the maximum size; and
wherein the retaining step retains only one expansion, the one on to the subpool, while other subpool expansions are released when storage is no longer immediately needed by the associated processes for which the expansion was established.

7. The method of claim 6, further comprising:
queuing the expansion to the memory subpool on bottom of the subpool when the subpool expansion size is tuned to less than the maximum size.

8. The method of claim 6, further comprising:
releasing the expansion from the subpool when storage for the expansion is not immediately needed by current processes, when the expansion is not on top of the subpool, and when the expansion is on top of the subpool but when the subpool expansion size is less than the maximum size.

9. The method of claim 8, wherein the queuing, retaining, and releasing is performed by automatic programmatic routines of a memory manager that handles the subpool.

10. The method of claim 9, wherein the subpool is one of a plurality of subpools handled by the memory manager, wherein each of said plurality of subpools corresponds to at least one of an application, thread, and task, and wherein said subpool and said expansion each comprise a plurality of buffers, wherein each of the plurality of buffers is of an equivalent size to the other ones of the plurality of buffers.

11. A computer program product improving subpool performance, the computer program product comprising:
  a non-transitory computer usable medium having computer usable program code embodied therewith, the computer usable program code comprising:
  computer usable program code configured to determine an appropriate subpool expansion size needed to satisfy storage requests by processes able to utilize a subpool of memory;
  computer usable program code configured to dynamically repeat the determining of the appropriate subpool expansion size as storage requirements change;
  computer usable program code configured to selectively add an expansion to the subpool to satisfy storage requests when additional storage is needed;
  computer usable program code configured to queue the added expansion on top of the subpool when a value of the subpool expansion size is a maximum size at a time that the added expansion is to be queued;
  computer usable program code configured to queue the added expansion on bottom of the subpool when the value of the subpool expansion size less than the maximum size at a time that the added expansion is to be queued;
  computer usable program code configured to determine that processes utilizing the queued expansion of the subpool have completed processing so that the queued expansion is no longer immediately necessary for storage of values relating to currently executing processes;
  computer usable program code configured to retain only one expansion queued on top of the subpool and when the value of the subpool expansion size is the maximum size at a time the currently executing processes utilizing the queued expansion have completed processing; and
  computer usable program code configured to release the queued expansion when the queued expansion is not on top of the subpool and when the queued expansion is on top of the subpool and when the value of the subpool expansion size is less than the maximum size at the time the currently executing processes utilizing the queued expansion have completed processing.

12. A computer program product of claim 11, further comprising:
  computer usable program code configured to tune the subpool to adjust the subpool expansion size when additional storage is needed and when the subpool expansion size is not at the maximum size.

13. A computer program product of claim 11, wherein the computer usable program code that selectively retains expansions placed on top of the subpool minimizes a frequency for which short term storage is allocated and released to prevent subpool thrashing.

14. A computer program product of claim 13, wherein the selective retention of expansions placed on top of the subpool occurs based upon memory management code, whereby the selective retention of expansions on top of the subpool is able to satisfy short term storage requests while avoiding executions of costly system code.

15. A computer program product of claim 14, wherein the subpool is one of a plurality of subpools handled by the memory management code, wherein each of said plurality of subpools corresponds to at least one of an application, thread, and task, and wherein said subpool and said expansion each comprise a plurality of buffers, wherein each of the plurality of buffers is of an equivalent size to the other ones of the plurality of buffers.

* * * * *